(12) United States Patent
Koizumi et al.

(10) Patent No.: US 7,938,238 B2
(45) Date of Patent: May 10, 2011

(54) ROTARY DAMPER

(75) Inventors: Kazuyoshi Koizumi, Sagamihara (JP);
Shunsuke Okabayashi, Toyota (JP);
Ken Hayashi, Aichi-ken (JP); Yoshihisa Takei, Sagamihara (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 0 days.

(21) Appl. No.: 10/572,378

(22) PCT Filed: Aug. 26, 2004

(86) PCT No.: PCT/JP2004/012677
§ 371 (c)(1),
(2), (4) Date: Mar. 16, 2006

(87) PCT Pub. No.: WO2005/028911
PCT Pub. Date: Mar. 31, 2005

(65) Prior Publication Data
US 2006/0207844 A1      Sep. 21, 2006

(30) Foreign Application Priority Data

Sep. 17, 2003  (JP) ................................. 2003-324890
Jan. 15, 2004  (JP) ................................. 2004-007951

(51) Int. Cl.
*F16F 11/00*      (2006.01)
*F16D 57/00*      (2006.01)
(52) U.S. Cl. ..................................... 188/322.5; 188/290
(58) Field of Classification Search .................. 188/290, 188/322.5
See application file for complete search history.

(56) References Cited

U.S. PATENT DOCUMENTS

| | | | | |
|---|---|---|---|---|
| 4,527,675 A | * | 7/1985 | Omata et al. | 188/290 |
| 4,571,773 A | * | 2/1986 | Yuda | 16/85 |
| 4,614,004 A | * | 9/1986 | Oshida | 16/82 |
| 4,618,039 A | * | 10/1986 | Omata | 188/268 |
| 4,691,811 A | * | 9/1987 | Arakawa et al. | 188/290 |
| 4,830,151 A | * | 5/1989 | Numata | 188/290 |

(Continued)

FOREIGN PATENT DOCUMENTS

EP      763671 A2 *   3/1997

(Continued)

*Primary Examiner* — Bradley T King
*Assistant Examiner* — Mahbubur Rashid
(74) *Attorney, Agent, or Firm* — Manabu Kanesaka (57) ABSTRACT

A rotary damper (D) is constituted by: housings (11, 51); a silicon oil (21) being housed inside the housings (11, 51); a rotor (31) wherein a resistive portion (36) moving through the silicon oil 21 inside the housings (11, 51) is provided in an axial portion (32) which is housed inside the housings (11, 51) and projects from the housings (11, 51); and an O-ring (61) preventing the silicon oil (21) from leaking between the axial portion (32) and the housing (51), and multiple arc-like through-bores (37) are provided in the resistive portion (36) on a concentric circle, and depressed grooves (38) communicating with the arc-like through-bores (37) are provided. Accordingly, during the assembly, the air being mixed into the housing is not allowed to be excessively compressed, so that even if the rotor rotates bi-directionally, the noise being caused by the air being mixed into the housing can be prevented.

9 Claims, 8 Drawing Sheets

U.S. PATENT DOCUMENTS

| | | | |
|---|---|---|---|
| 4,908,905 A | 3/1990 | Kanno et al. | |
| 4,938,322 A * | 7/1990 | Sugasawara et al. | 188/290 |
| 5,211,267 A * | 5/1993 | Clark | 188/276 |
| 5,269,397 A * | 12/1993 | Kawamoto et al. | 188/290 |
| 5,301,775 A * | 4/1994 | Nedbal et al. | 188/290 |
| 5,460,252 A * | 10/1995 | Kosugi et al. | 188/291 |
| 5,522,485 A * | 6/1996 | Takahashi et al. | 188/306 |
| 6,298,960 B1 * | 10/2001 | Derr | 188/290 |
| D479,242 S * | 9/2003 | Kurachi et al. | D14/483 |
| 2004/0045398 A1 * | 3/2004 | Hayashi | 74/574 |

FOREIGN PATENT DOCUMENTS

| | | |
|---|---|---|
| JP | 58099539 | 6/1983 |
| JP | 61065907 | 4/1986 |
| JP | 62-270845 | 11/1987 |
| JP | 01-182643 | 7/1989 |
| JP | 05-044760 | 2/1993 |
| JP | 05044760 | 2/1993 |
| JP | 07317820 | 12/1995 |
| WO | WO 2005/045276 | 5/2005 |

* cited by examiner

ROTARY DAMPER

TECHNICAL FIELD

The present invention relates to a rotary damper for damping the rotation of a driven gear which engages with, for example, a gear or rack.

BACKGROUND OF THE ART

A rotary damper disclosed in the Japanese Patent Publication No. 4-34015 is constituted of: a housing; viscous fluid being housed inside the housing; a rotor wherein a resistive portion moving through the viscous fluid inside the housing is provided in an axial portion which is housed inside the housing and whose one part projects from the housing; and a sealing member which prevents the viscous fluid from leaking between the axial portion of the rotor and the housing. A driven gear is attached to the axial portion projecting from the housing.

In the above-mentioned conventional rotary damper, the resistive portion has a roughly oval shape so that the air being mixed into the housing when the rotary damper is assembled is not allowed to be located between the resistive portion of the rotor which is a part of torque occurrence and the bottom face or ceiling face of the housing.

However, since the rotor rotates bi-directionally, when the air being mixed into the housing climbs over the resistive portion and moves to the opposite side of the resistive portion, the air makes a noise.

The noise which occurs when the air being mixed into the housing climbs over the resistive portion is regarded as a plosive sound being caused by the following. When the air being mixed into the housing climbs over the resistive portion after the air being mixed into the housing is compressed by climbing over the resistive portion, the air being mixed into the housing is rapidly opened so that the plosive sound is made.

Incidentally, the higher the degree of viscosity the viscous fluid has, the easier the noise is made. Also, the narrower the distance between the rotor and housing is, the easier the noise is made.

The purpose of the invention is to provide a rotary damper which prevents the noise being caused by the air being mixed into the housing.

DISCLOSURE OF INVENTION

A rotary damper of the invention is constituted by: a housing; viscous fluid being housed inside the housing; a rotor wherein a resistive portion moving through the viscous fluid inside the housing is provided in an axial portion being housed inside the housing and whose one part projects from the housing; and a sealing member which prevents the viscous fluid from leaking between the axial portion and the housing. In the rotary damper, multiple air retention portions are provided in the resistive portion in a circumferential direction and an air movement passage connecting the air retention portions is provided.

Also, in the rotary damper of the invention, the air retention portions are formed by through-bores, and the air movement passage is formed by a depressed groove.

In addition, in the rotary damper of the invention, the multiple air retention portions are formed on a concentric circle, and the air movement passage includes a circumferential groove corresponding to the air retention portions and being provided in the housing.

Also, in the rotary damper of the invention, the multiple air retention portions are formed between the outer circumferential surface of the resistive portion and the inner circumferential surface of the housing in a circumferential direction.

According to the invention, as described in the above, the multiple air retention portions (through-bores) are provided in the resistive portion in a circumferential direction, and the air movement passage (depressed groove) connecting the air retention portions (through-bores) is provided, so that when the rotary damper is assembled, the air being mixed into the housing can be moved from one air retention portion (through-bore) to another air retention portion (though-bore) in a state wherein the air being mixed into the housing is not excessively compressed.

Therefore, even if the rotor rotates bi-directionally, the noise being caused by the air being mixed into the housing can be prevented.

Moreover, the multiple air retention portions are formed on a concentric circle, and the air movement passage includes the circumferential groove being provided in the housing and corresponding to the air retention portions. Accordingly, when the rotary damper is assembled, the air being mixed into the housing can be moved from one air retention portion to the other air retention portion in a state of being additionally compressed, so that the noise being caused by the air being mixed into the housing can be additionally prevented.

Also, since the multiple air retention portions are formed between the outer circumferential surface of the resistive portion and the inner circumferential surface of the housing in a circumferential direction, when the rotary damper is assembled, the air being mixed into the housing can be moved from one air retention portion to the other air retention portion without being additionally compressed, so that the noise being caused by the air being mixed into the housing can be additionally prevented.

Also, since the multiple air retention portions are formed between the outer circumferential surface of the resistive portion and the inner circumferential surface of the housing in a circumferential direction, when the rotary damper is assembled, the air being mixed into the housing can be reliably located in the air retention portions.

PREFERRED EMBODIMENTS FOR OPERATION OF INVENTION

The present invention will be explained with reference to the attached figures in detail.

Figure 1:
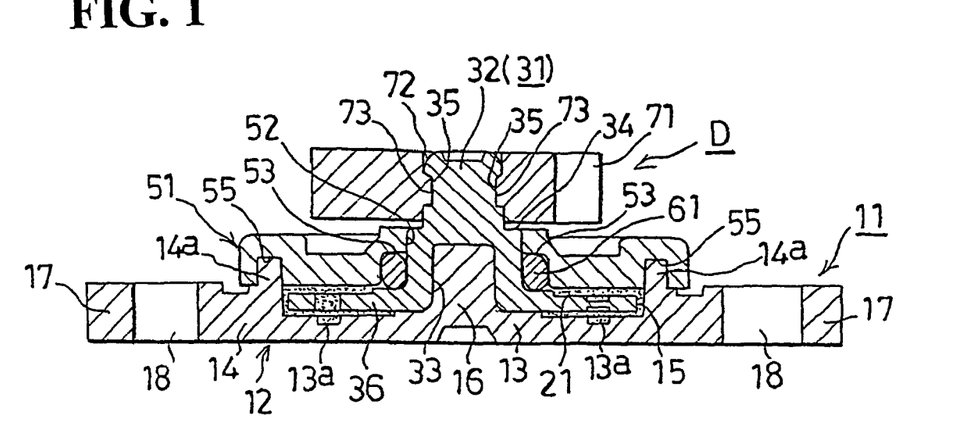
FIG. 1 is a cross-sectional view showing a first embodiment of a rotary damper of the present invention.
Figure 2:
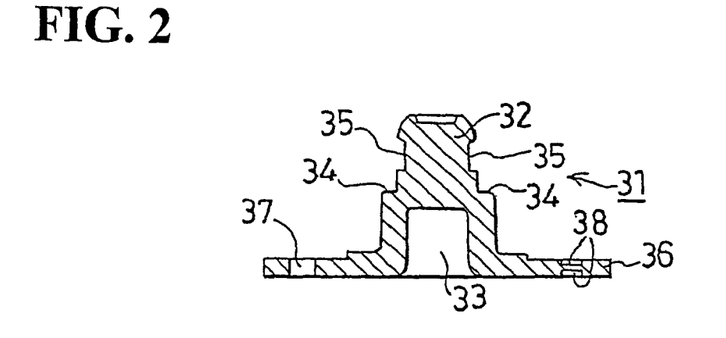
FIG. 2 is a cross-sectional view of a rotor of the rotary damper in FIG. 1.
Figure 3:
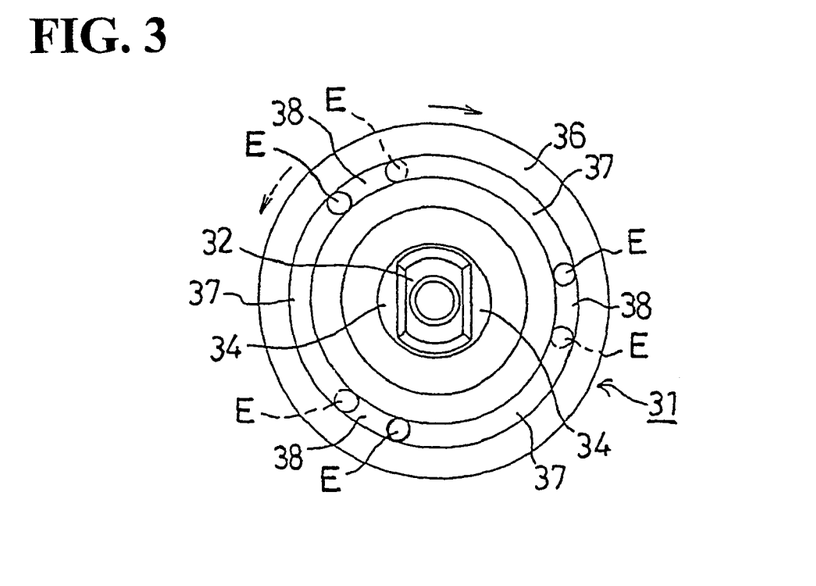
FIG. 3 is a plan view of the rotor shown in FIG. 2.
Figure 4:
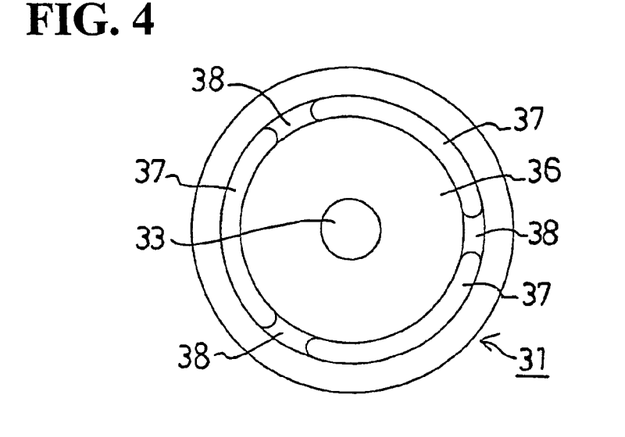
FIG. 4 is a bottom plan view of the rotor shown in FIG. 2.

FIG. 1 is a cross-sectional view showing the first embodiment of a rotary damper of the present invention; FIG. 2 is a cross-sectional view of a rotor of the rotary damper in FIG. 1; FIG. 3 is a plan view of the rotor shown in FIG. 2; and FIG. 4 is a bottom plan view of the rotor shown in FIG. 2.

In FIG. 1, the reference alphabet D represents the rotary damper including: a plastic case 11; a silicon oil 21 as viscous fluid being housed inside the case 11; a plastic rotor 31 wherein a resistive portion 36 moving through the silicon oil 21 inside the case 11 is provided in an axial portion 32 which is housed inside the case 11 and whose one part projects from the case 11 to the outside; and a through-bore 52 wherein the axial portion 32 of the rotor 31 penetrates. The rotary damper D is constituted by: a plastic cap 51 blocking an opening of the case 11; an O-ring 61 as a sealing member preventing the silicon oil 21 from leaking between the cap 51 and the axial portion 32 of the rotor 31; and a plastic driven gear 71 being attached to the axial portion 32 of the rotor 31 projecting from the cap 51.

Incidentally, the housing is constituted by the case 11 and the cap 51.

The above-mentioned case 11 is constituted by: a case main body 12 wherein a cylindrical wall portion 14 circling the outer edge of a bottom portion 13 whose planar shape is a circle is provided; a cylindrical axial supporting portion 16 being provided at the center of the bottom face of the bottom portion 13; and mounting flanges 17 with mounting bores 18 being provided around the outer circumference of the case main body 12, for example, in a radial direction at intervals of 180 degrees.

On the bottom face of the bottom portion 13, a circumferential groove 13a corresponding to arc-like through-bores 37 described hereinafter is provided on a concentric circle centering on the center of the axial supporting portion 16 as an air movement passage.

Also, on the upper side of the cylindrical wall portion 14, a circling thin-walled projecting cylinder portion 14a whose inner circumferential face is the extended face of the inner circumferential face of the cylindrical wall portion 14 is provided.

Incidentally, the reference numeral 15 represents a housed portion being formed inside the case main body 12, and the housed portion is a part wherein the silicon oil 21 is housed and represents a lower part from the thin-walled projecting cylinder portion 14a.

The rotor 31 is constituted by: a cylindrical axial portion 32; and a tabular resistive portion 36 which is continuously provided in the axial portion 32 and circular in plan view.

A cylindrical cavity 33 wherein the axial supporting portion 16 of the case 11 engages to be able to rotate is provided on the bottom surface of the axial portion 32. I-cut step portions 34 which are cut in an I-shape are provided in a part projecting from the cap 51, and fitting grooves 35 are provided in flat surface parts (vertical surfaces) which are cut in the I-shape in a horizontal direction, respectively.

Also, as shown in FIGS. 2-4, in the resistive portion 36, multiple arc-like through-bores 37 are provided on a concentric circle centering on the center of the axial portion 32 as the air retention portion. At the same time, depressed grooves 38 communicating with the arc-like through-bores 37 are provided on a concentric circle of the arc-like through-bores 37 as the air movement passage.

Incidentally, the depressed grooves 38 are provided above and below (both sides) of the resistive portion 36.

The through-bore 52 wherein the axial portion 32 of the rotor 31 penetrates is provided at the center of the cap 51. A diameter-expansion step portion 53 which is cylindrically cut out in such a way of reaching to the lower end and houses the O-ring 61 is provided on the lower side of the through-bore 52. Moreover, a circling fitting depressed groove 55 wherein the thin-walled projecting cylinder portion 14a of the case main body 12 fits is provided on the outer edge of the lower side.

Also, an I-cut mounting bore 72 is provided at the center of the driven gear 71, and fitting projections 73 fitting into the fitting grooves 35 being provided in the axial portion 32 of the rotor 31 are provided in the flat surface parts of the mounting bore 72.

Next, an example of assembling of the rotary damper D will be explained.

First, after the axial portion 32 of the rotor 31 is fitted into the O-ring 61 and the silicon oil 21 is applied to the cavity 33 and the resistive portion 36, one part of the axial portion 32 and the resistive portion 36 are housed inside the housed portion 15 in such a way that the axial supporting portion 16 of the case 11 is fitted into the cavity 33.

After an appropriate amount of the silicon oil 21 is injected into the housed portion 15, the thin-walled projecting cylinder portion 14a is fitted into the fitting depressed groove 55 of the cap 51 while the axial portion 32 is inserted into the through-bore 52, and an opening of the case 11 is blocked by the cap 51.

Herewith, when the opening of the case 11 is blocked by the cap 51, air E inside the thin-walled projecting cylinder portion 14a is mostly discharged out of the case 11, and the thin-walled projecting cylinder portion 14a and the cap 51 are attached. At the same time, the O-ring 61 is housed inside the diameter-expansion step portion 53, so that the O-ring 61 prevents the silicon oil 21 from leaking between the axial portion 32 and the cap 51.

Next, the thin-walled projecting cylinder portion 14a and the cap 51 are welded and sealed, for example, in such a way of circling with high frequency welding.

When the axial portion 32 projecting from the cap 51 is pressed into the mounting bore 72 of the driven gear 71, the fitting projections 73 are fitted into the fitting grooves 35 so that the assembling of the rotary damper D is completed.

Next, operation will be explained.

First, as shown in a solid line arrow in FIG. 3, when the rotor 31 rotates clockwise viewed from above, the resistive portion 36 rotates clockwise inside the silicon oil 21, and viscosity resistance and shear resistance of the silicon oil 21 affect the resistive portion 36. As a result, the rotation of the rotor 31 is damped.

Therefore, the rotation or movement of the gear wherein the driven gear 71 being attached to the rotor 31 engages, rack and so on is damped and slowed down.

Herewith, when the rotor 31 rotates clockwise, a negative pressure portion is generated in lower ends of the depressed grooves 38 so that the air E being mixed into the case 11 during the assembling follows the negative pressure portion and moves as shown in the solid line.

As shown in a dotted line arrow in FIG. 3, when the rotor 31 rotates counterclockwise viewed from above, the resistive portion 36 rotates counterclockwise inside the silicon oil 21, and the viscosity resistance and shear resistance of the silicon oil 21 affect the resistive portion 36. As a result, the rotation of the rotor 31 is damped.

Therefore, the rotation or movement of the gear wherein the driven gear 71 being attached to the rotor 31 engages, the rack and so on is damped and slowed down.

When the rotor 31 rotates counterclockwise as described above, the air E shown in the solid line in FIG. 3 heads toward the negative pressure portion being generated in the lower ends of the depressed grooves 38, so that the air E moves to a position shown in a dotted line in FIG. 3 passing clockwise through the circumferential groove 13a and the depressed grooves 38, and moves following the negative pressure portion.

Herewith, the air E which moves from one arc-like through-bore 37 to the other arc-like through-bore 37 moves from one arc-like through-bore 37 to the other arc-like through-bore 37, passing through the circumferential groove 13a and the depressed grooves 38 in a state of being almost not compressed.

As described above, according to the first embodiment of the invention, in the resistive portion 36, the multiple arc-like through-bores 37 are provided on a concentric circle, and the depressed grooves 38 connecting the arc-like through-bores 37 are provided. As a result, during the assembly, the air E being mixed into the housing can be moved from one arc-like through-bore 37 to the other arc-like through-bore 37 in a state of not being excessively compressed.

Therefore, even if the rotor 31 rotates bi-directionally, the noise being caused by the air E being mixed into the housing can be prevented.

Moreover, since the circumferential groove 13a is provided in the case 11, during the assembly, the air E being mixed into the housing can be moved from one arc-like through-bore 37 to the other arc-like through-bore 37 in a state of not being additionally compressed so that the noise being caused by the air E being mixed into the housing can be additionally prevented.

Figure 5:
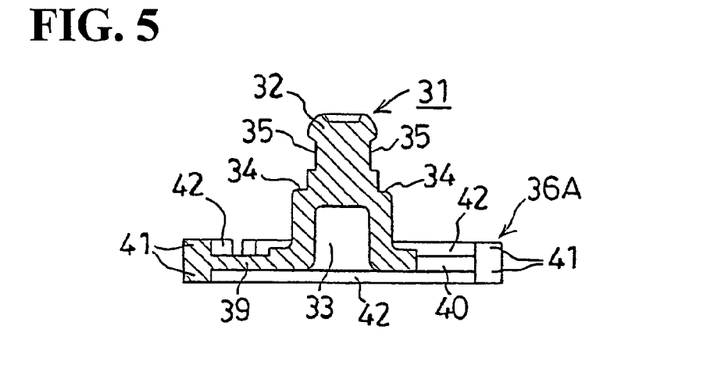
FIG. 5 is a cross-sectional view of the rotor constituting the rotary damper of the second embodiment of the invention.
Figure 6:
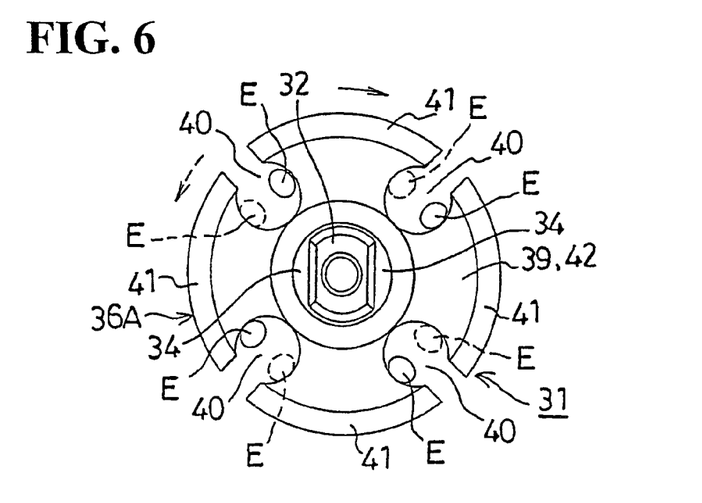
FIG. 6 is a plan view of the rotor shown in FIG. 5.
Figure 7:
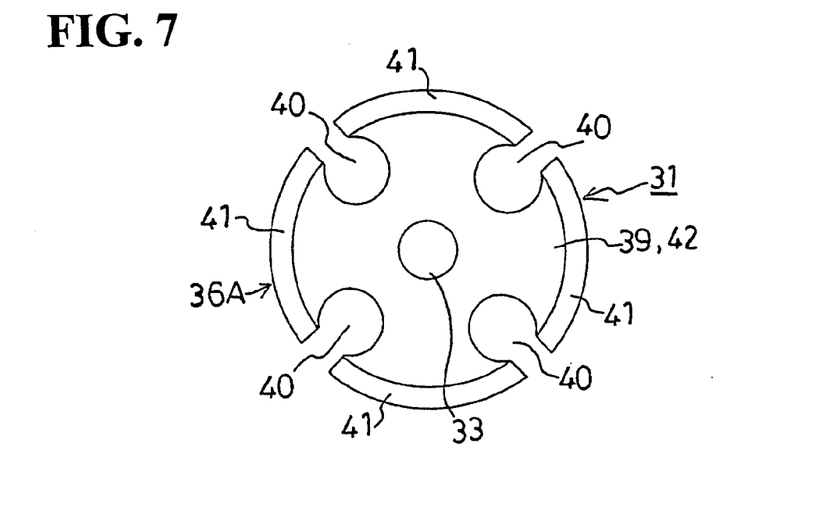
FIG. 7 is a bottom plan view of the rotor shown in FIG. 5.

FIG. 5 is a cross-sectional view of the rotor constituting the rotary damper of the second embodiment of the invention; FIG. 6 is a plan view of the rotor shown in FIG. 5; FIG. 7 is a bottom plan view of the rotor shown in FIG. 5; and the explanation is omitted by using the same symbols for the same parts or corresponding parts of FIGS. 1-4.

Incidentally, the parts being omitted in the figures are constituted as with the first embodiment.

In the figures, the plastic rotor 31 is constituted by: the axial portion 32 being housed inside the case 11 and whose one part projects to the outside from the case 11; and a tabular resistive portion 36A with a circle shape in plan view which is provided in the axial portion 32 and moves through the silicon oil 21 inside the case 11.

The resistive portion 36A is constituted by: a thin-walled circular disc portion 39, for example, whose 90-degree divided four circular notches 40 are provided on the outer circumferential edge as the air retention portions; and circular arc projections 41 being provided on the outer circumferential edge of the thin-walled circular disc portion 39.

Incidentally, as shown in FIGS. 5-7, the circular arc projections 41 are provided above and below (both sides) of the thin-walled circular disc portion 39.

An inner circular depressed portion 42 which is surrounded with the circular arc projections 41 forms the air movement passage connecting the notches 40.

Also, intervals of the circumferential direction of the circular arc projections 41 are narrower than the greatest width (diameter) of the circumferential direction of the notches 40. Right-and-left ends of the circumferential direction of the notches 40 have the positional relationship of overlapping with the circular arc projections 41 in the circumferential direction.

Next, since the assembly of the rotary damper D is the same as the first embodiment, the explanation is omitted and the operation will be explained.

First, as shown in a solid line arrow in FIG. 6, when the rotor 31 rotates clockwise viewed from above, the resistive portion 36A rotates clockwise inside the silicon oil 21, and the viscosity resistance and shear resistance of the silicon oil 21 affect the resistive portion 36A. As a result, the rotation of the rotor 31 is damped.

Therefore, the rotation or movement of the gear wherein the driven gear 71 being attached to the rotor 31 engages, the rack and so on is damped and slowed down.

When the rotor 31 rotates clockwise as described above, the negative pressure portion is generated in upper ends of the notches 40 so that the air E being mixed into the case 11 during the assembling follows the negative pressure portion and moves as shown in solid line.

As shown in a dotted line arrow in FIG. 6, when the rotor 31 rotates counterclockwise viewed from above, the resistive portion 36A rotates clockwise inside the silicon oil 21, and the viscosity resistance and shear resistance of the silicon oil 21 affect the resistive portion 36A. As a result, the rotation of the rotor 31 is damped.

Therefore, the rotation or movement of the gear wherein the driven gear 71 being attached to the rotor 31 engages, the rack and so on is damped and slowed down.

When the rotor 31 rotates counterclockwise as described above, the air E shown in the solid line in FIG. 6 heads toward the negative pressure portion being generated in the upper ends of the notches 40, so that the air E moves to a position shown with a dotted line in FIG. 6 passing clockwise through the circular depressed portion 42, and moves following the negative pressure portion.

Herewith, the air E which moves from one notch 40 to the other notch 40 passes through the circular depressed portion 42 in a state of being almost not compressed, and moves from one notch 40 to the other notch 40.

Even if the air E heading toward the other notch 40 out of one notch 40 is centrifuged, the circular arc projections 41 lead the air E so that the air E is reliably moved to the other notch 40 from one notch 40 through the circular depressed portion 42.

As described above, the second embodiment of the invention can achieve the same effect as the first embodiment.

Figure 8:
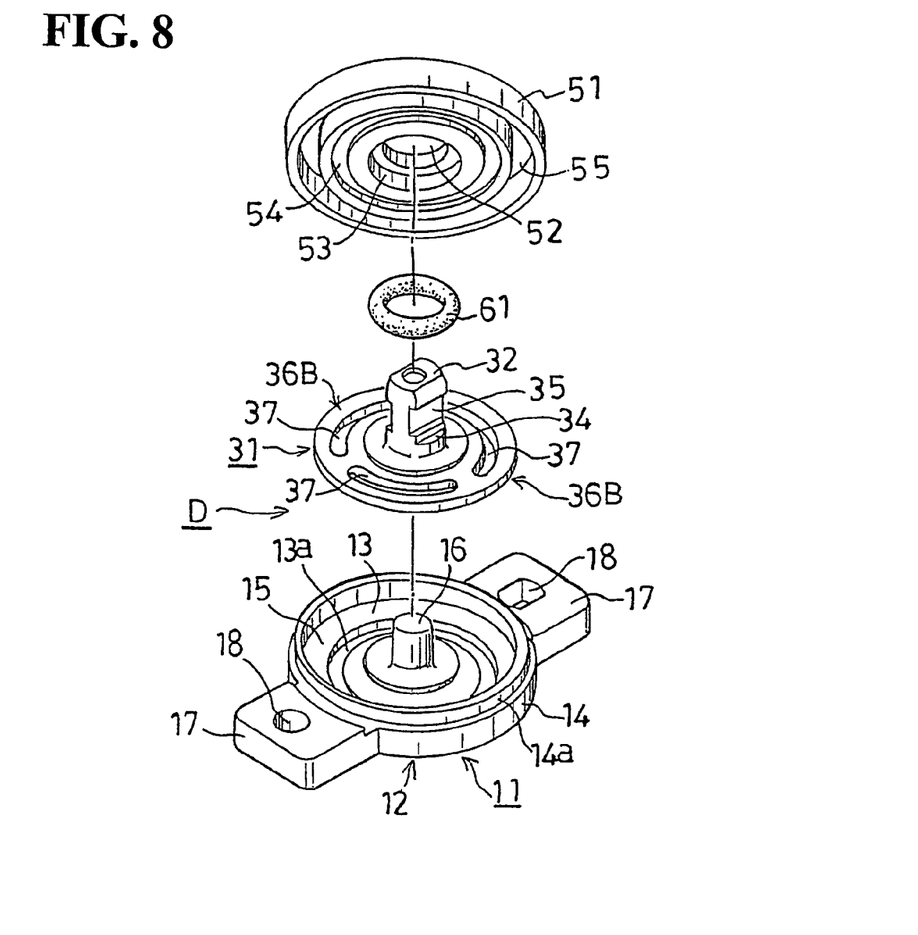
FIG. 8 is an exploded perspective view of the third embodiment of the rotary damper of the invention.

FIG. 8 is an exploded perspective view of the rotary damper of the third embodiment of the invention, and the explanation is omitted by using the same symbols for the same parts or corresponding parts of FIGS. 1-7.

In FIG. 8, the plastic rotor 31 is constituted by: the axial portion 32 being housed in the case 11 and whose one part projects from the case 11 to the outside; and a tabular resistive portion 36B with the circle shape in plan view which is provided in the axial portion 32 and moves through the silicon oil 21 inside the case 11.

The multiple arc-like through-bores 37 are provided on a concentric circle centering on the center of the axial portion 32 in the resistive portion 36B as the air retention portion.

Also, a circumferential groove 54 is provided on the lower side face of the cap 51, corresponding to the arc-like through-bores 37, on a concentric circle centering on the center of the through-bore 52 as the air movement passage.

Incidentally, since the assembly and operation of the rotary damper D are the same as those of the first embodiment, explanation thereof is omitted; however, the air E which moves from one arc-like through-bore 37 to the other arc-like through-bore 37 moves from one arc-like through-bore 37 to the other arc-like through-bore 37, passing through the circumferential grooves 13a, 54 in a state of being almost not compressed.

Therefore, according to the third embodiment, the same effect with the first embodiment can be achieved.

Since the circumferential groove 13a is provided in the case 11 and the circumferential groove 54 is provided in the cap 51, the air E being mixed into the housing during the assembly can be moved from one arc-like through-bore 37 to the other arc-like through-bore 37 in a state of being almost not compressed additionally. As a result, the noise being caused by the air E being mixed into the housing can be additionally prevented.

Figure 9:
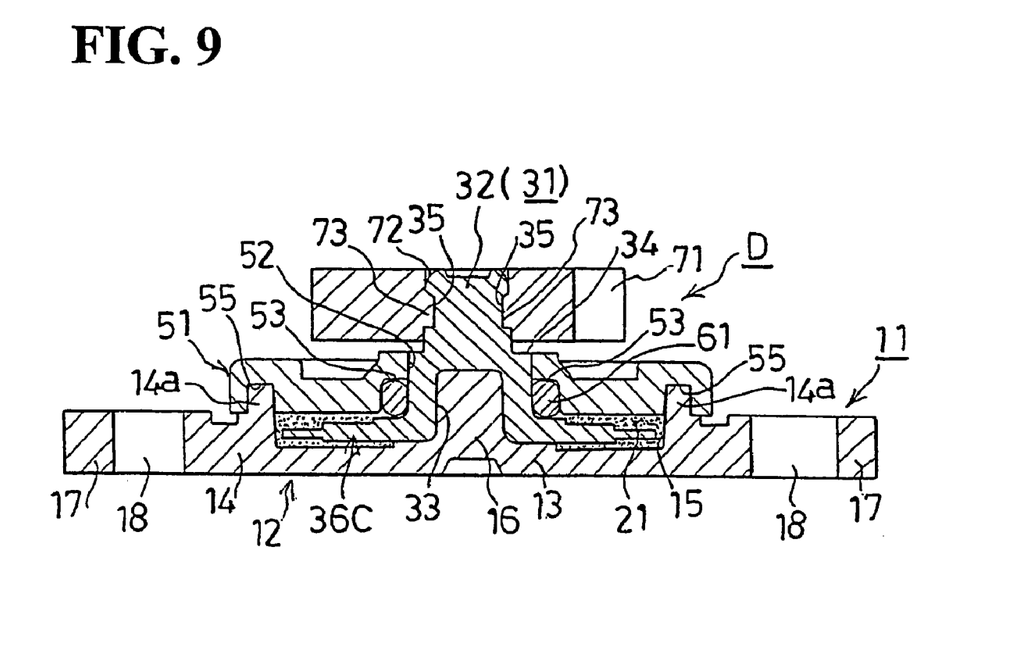
FIG. 9 is a cross-sectional view of the fourth embodiment of the rotary damper of the invention.
Figure 10:
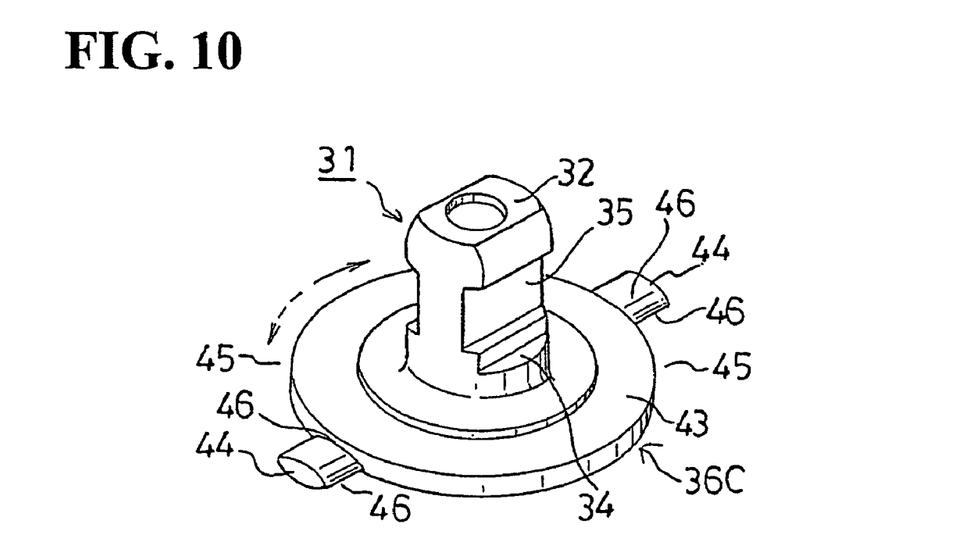
FIG. 10 is a perspective view of the rotor of the rotary damper in FIG. 9.

FIG. 9 is a cross-sectional view of the rotary damper of the fourth embodiment of the invention; FIG. 10 is a perspective view of the rotor shown in FIG. 9; and the explanation is omitted by using the same symbols for the same parts or corresponding parts of FIGS. 1-8.

In these figures, the plastic rotor 31 is constituted by: the axial portion 32 being housed inside the case 11 and whose one part projects to the outside from the case 11; and a resistive portion 36C which is provided in the axial portion 32 and moves through the silicon oil 21 inside the case 11.

The resistive portion 36C has a circle in plan view and is constituted by: a tabular resistive-portion main body 43 which has a slightly smaller diameter than the inner diameter of the cylindrical wall portion 14 constituting the case 11; and thin-walled tabular air movement passage formative projections 44 being provided on the outer circumferential surface of the resistive-portion main body 43, for example, in a radial shape in order to form air movement passages 46 at intervals of 180 degrees.

Incidentally, an air retention portion 45 is formed outside (outer circumference) of the resistive-portion main body 43 being sandwiched in the air movement passage formative projections 44, and the air movement passages 46 become parts of above-and-below (both sides) of the air movement passage formative projections 44.

Next, since the assembly of the rotary damper D is the same as that of the first embodiment, the explanation is omitted and the operation will be explained.

First, as shown in a solid line arrow in FIG. 10, when the rotor 31 rotates clockwise, the resistive portion 36C rotates clockwise inside the silicon oil 21, and the viscosity resistance and shear resistance of the silicon oil 21 affect the resistive-portion main body 43. As a result, the rotation of the rotor 31 is damped.

Therefore, the rotation or movement of the gear wherein the driven gear 71 being attached to the rotor 31 engages, the rack and so on is damped and slowed down.

When the rotor 31 rotates clockwise as described above, the negative pressure portion is generated in the lower ends of the air movement passage formative projections 44, so that the air E being mixed into the housing during the assembling moves following the negative pressure portion.

As shown in a dotted line arrow in FIG. 10, when the rotor 31 rotates counterclockwise, the resistive portion 36C rotates counterclockwise inside the silicon oil 21, and the viscosity resistance and shear resistance of the silicon oil 21 affect the resistive-portion main body 43. As a result, the rotation of the rotor 31 is damped.

Therefore, the rotation or movement of the gear wherein the driven gear 71 being attached to the rotor 31 engages, the rack and so on is damped and slowed down.

When the rotor 31 rotates counterclockwise as described above, the air E which was moving following the negative pressure portion being generated in the lower ends of the air movement passage formative projections 44 when the rotor 31 is rotating clockwise, heads toward the lower ends wherein the negative pressure portion is generated and which become the opposite side of a circumferential direction of the air movement passage formative projections 44. As a result, the air E moves passing above and below the air movement passages 46 and moves following the negative pressure portion.

Herewith, the air E which moves from one air retention portion 45 to the other air retention portion 45 moves from one air retention portion 45 to the other air retention portion 45, passing above and below the air movement passages 46 in a state of being almost not compressed.

As described above, the fourth embodiment of the invention can achieve the same effect as the first embodiment. At the same time, since the multiple air retention portions 45 are formed between the outer circumferential surface of the resistive portion 36C and the inner circumferential surface of the case 11 in a circumferential direction, the air E being mixed into the housing during the assembly can be reliably located in the air retention portions 45.

Figure 11:
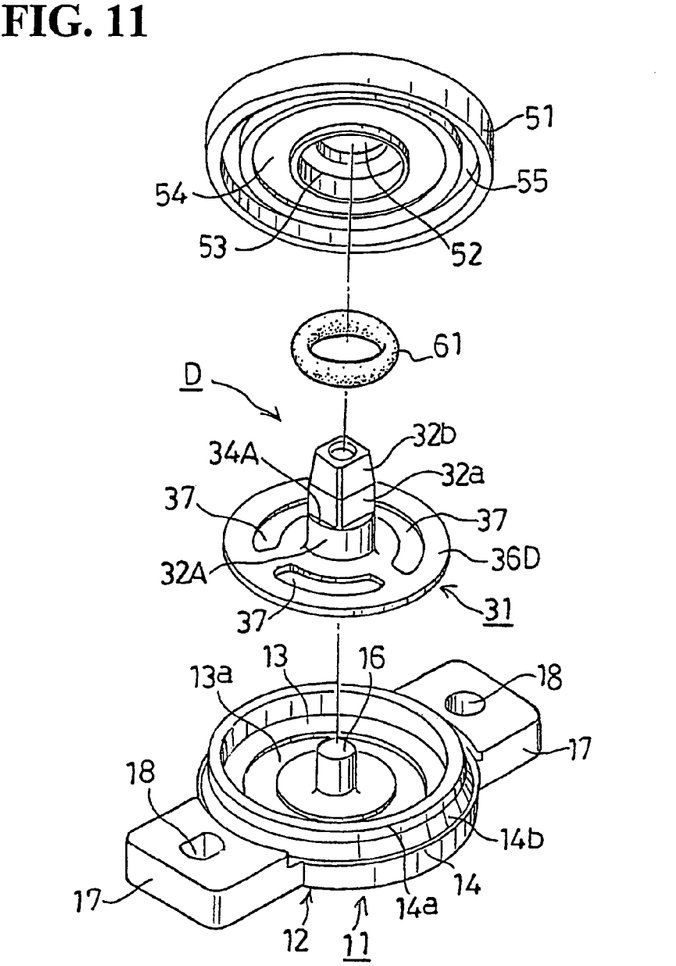
FIG. 11 is an exploded perspective view of the fifth embodiment of the rotary damper of the invention.
Figure 12:
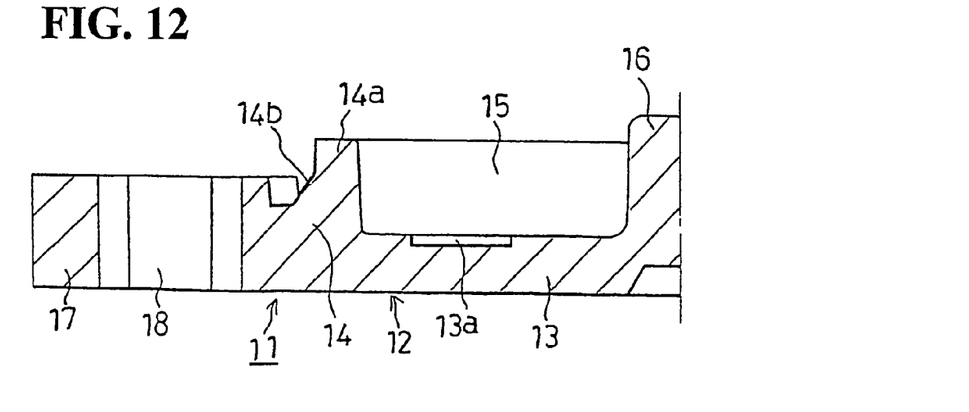
FIG. 12 is an expanded sectional view of the left half of the rotary damper shown in FIG. 11.
Figure 13:
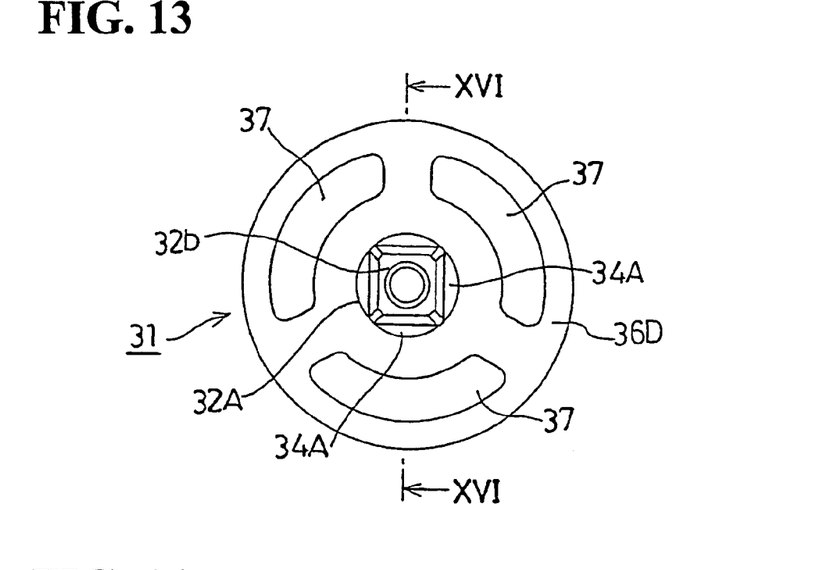
FIG. 13 is a plan view of the rotor of the rotary damper shown in FIG. 11.
Figure 14:
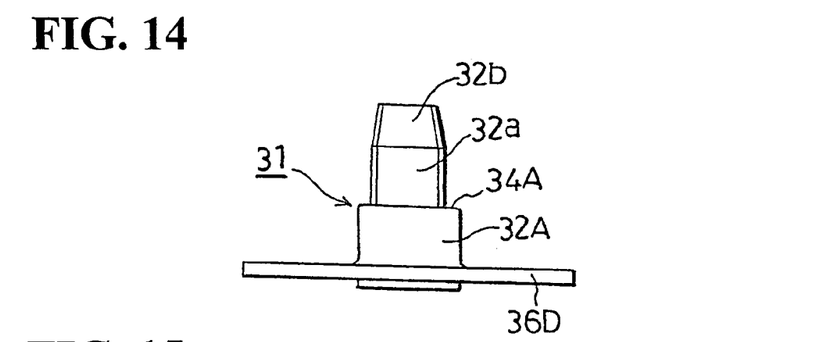
FIG. 14 is a front view of the rotor shown in FIG. 13.
Figure 15:
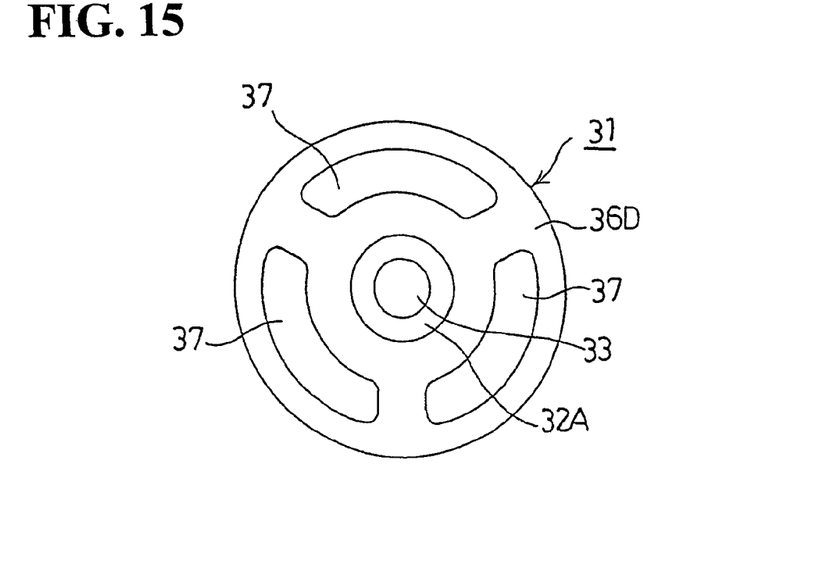
FIG. 15 is a bottom plan view of the rotor shown in FIG. 13.
Figure 16:
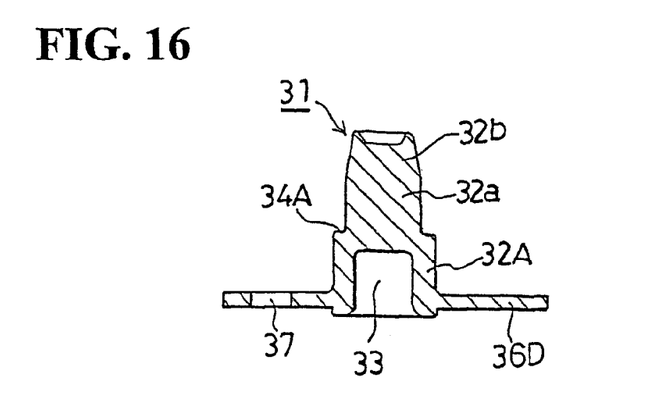
FIG. 16 is a cross-sectional view taken along line XVI-XVI in FIG. 13.
Figure 17:
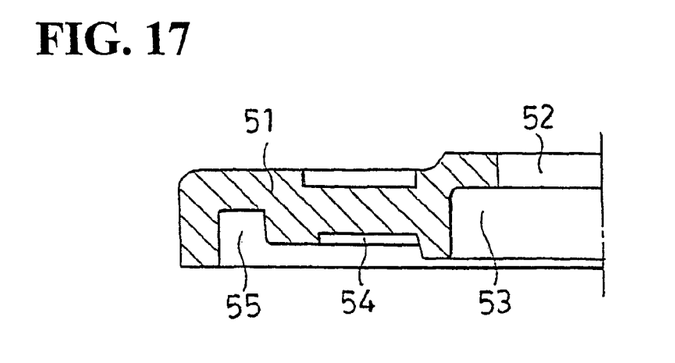
FIG. 17 is an expanded sectional view of the left half of a cap of the rotary damper shown in FIG. 11.
Figure 18:
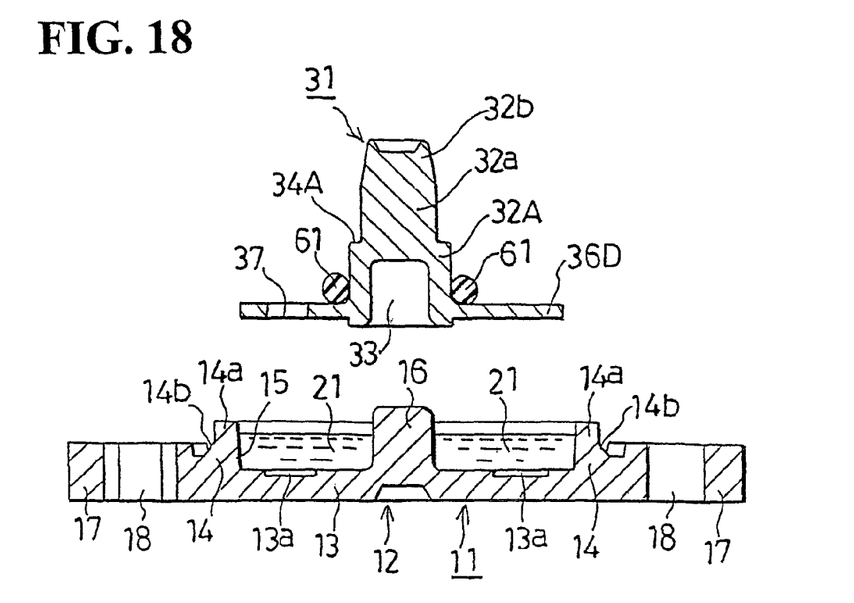
FIG. 18 is an explanatory drawing of an assembling process of the rotary damper in FIG. 11.
Figure 19:
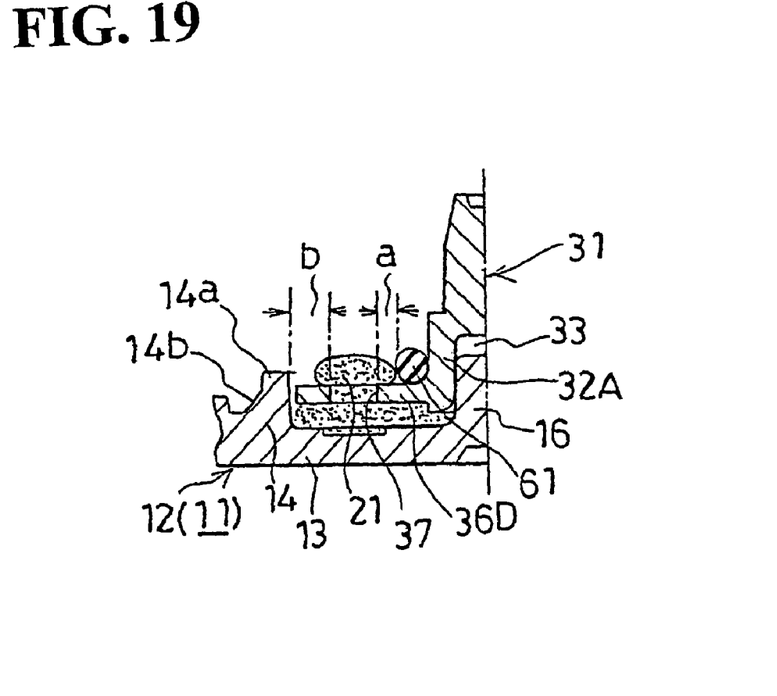
FIG. 19 is a fragmentary explanatory drawing of the assembling process of the rotary damper in FIG. 11.
Figure 20:
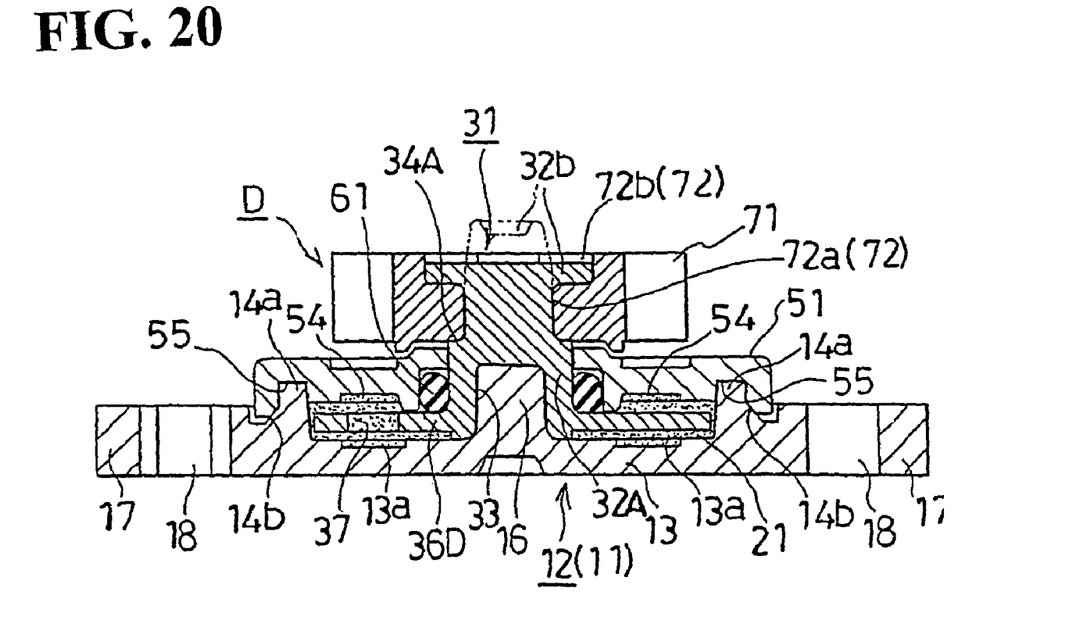
FIG. 20 is a cross-sectional view of the state wherein the rotary damper in FIG. 11 is assembled.

FIG. 11 is an exploded perspective view of the rotary damper of the fifth embodiment of the invention; FIG. 12 is an expanded sectional view of the left half of the case shown in FIG. 11; FIG. 13 is a plan view of the rotor shown in FIG. 11; FIG. 14 is a front view of the rotor shown in FIG. 11; FIG. 15 is a bottom plan view of the rotor shown in FIG. 11; FIG. 16 is a cross-sectional view taken along line XVI-XVI in FIG. 13; FIG. 17 is an expanded sectional view of the left half of a cap shown in FIG. 11; FIGS. 18, 19 are explanatory drawings of an assembling process of the rotary damper; FIG. 20 is a cross-sectional view of the rotary damper of the fifth embodiment of the invention; and the explanation is omitted by using the same symbols for the same parts or corresponding parts of FIGS. 1-10.

In these figures, the plastic case 11 is constituted of: a case main body 12 wherein the cylindrical wall portion 14 circling the outer edge of the bottom portion 13 whose planar shape is a circle is provided; the cylindrical axial supporting portion 16 being provided at the center of the bottom face of the bottom portion 13; and the mounting flanges 17 with the mounting bores 18 being provided on the outer circumference of the case main body 12 at intervals of 180 degrees in a radial direction.

On the bottom face of the bottom portion 13, the circumferential groove 13a corresponding to the arc-like through-bores 37 of the rotor 31 is provided as the air movement passage on the concentric circle centering on the center of the axial supporting portion 16.

Also, on the upper side of the cylindrical wall portion 14, the circling thin-walled projecting cylinder portion 14a whose inner circumferential face is the extended face of the inner circumferential face of the cylindrical wall portion 14 is provided. A circling diameter-opening inclination 14b which expands toward a case main body 13 side is provided on the boundary between the thin-walled projecting cylinder portion 14a and the cylindrical wall portion 14 in order to weld the outer circumferential part of the cap 51.

Next, the plastic rotor 31 is constituted of: a cylindrical axial portion 32A; and a tabular resistive portion 36D which is continuously provided in the axial portion 32A and has a circular shape in plan view.

The cylindrical cavity 33 wherein the axial supporting portion 16 of the case 11 engages to be able to rotate is provided on the bottom surface of the axial portion 32A, and a step portion 34A is provided on the part projecting from the cap 51.

Incidentally, the upper part of the axial portion 32A above the step portion 34A has a square frustum 32b which is concentric with the axial portion 32A and continuously provided on the upper side of a square pole 32a which is concentric with the axial portion 32A.

Also, in the plastic driven gear 71, a mounting bore 72A wherein a diameter-expansion step portion 72b which is concentric with a square hole 72a is continuously provided is provided at the center on the upper side of the square hole 72a.

Incidentally, in the embodiment, as shown in FIG. 12, the width of the circumferential grooves 13a, 54 is wider than the width of the arc-like through-bores 37, and also the arc-like through-bores 37 are located inside the circumferential grooves 13a, 54.

Next, an example of the assembling of the rotary damper D will be explained.

First, as shown in FIG. 18, the axial portion 32A of the rotor 31 is fitted into the O-ring 61, and an appropriate amount of the silicon oil 21 is injected into the housed portion 15. As shown in FIG. 19, a part of the axial portion 32A and the resistive portion 36D are housed inside the housed portion 15 in such a way that the axial supporting portion 16 of the case 11 is fitted into the cavity 33.

Incidentally, after the silicon oil 21 is applied to the cavity 33 and the lower side (lower surface) part of the resistive portion 36D, the appropriate amount of the silicon oil 21 may be injected into the housed portion 15, and a part of the axial portion 32A and the resistive portion 36D may be housed inside the housed portion 15 in such a way that the axial supporting portion 16 of the case 11 is fitted into the cavity 33.

In this case, since the air stops retaining in the cavity 33 of the rotor 31, the air remaining in the housing can be reduced.

Herewith, when one part of the axial portion 32A and the resistive portion 36D are housed inside the housed portion 15, the silicon oil 21 which is pushed by the resistive portion 36D and surfaced from the arc-like through-bores 37 gets through the O-ring 61, resistive portion 36D, and axial portion 32A due to a capillary phenomenon because a distance a between the inner circumference of the arc-like through-bores 37 and the O-ring 61 is closer than a distance b between the outer circumference of the arc-like through-bores 37 and the thin-walled projecting cylinder portion 14a. As a result, the O-ring 61 is prevented from sticking to the resistive portion 36D and the axial portion 32A, and the silicon oil 21 stops overflowing out of the thin-walled projecting cylinder portion 14a.

The thin-walled projecting cylinder portion 14a is fitted into the fitting depressed groove 55 of the cap 51 while the axial portion 32A is inserted into the through-bore 52, and the opening of the case 11 is blocked by the cap 51.

Herewith, when the opening of the case 11 is blocked by the cap 51, the silicon oil 21 which is located near the O-ring 61 is compressed on the inner wall surface of the cap 51, and gradually moves toward the outside of a circumferential direction. As a result, the air inside the housed portion 15 is pushed out from between the cap 51 and the opening of the case 11 by the silicon oil 21, and in a state wherein the air remaining inside the housing becomes less, the cylindrical part of the outer circumferential edge forming the fitting depressed groove 55 of the cap 51 abuts against the diameter-opening inclination 14b, and the upper end of the thin-walled projecting cylinder portion 14a and the bottom of the fitting depressed groove 55 are opposed with a small interval.

In this state, the cap 51 is pushed toward the case main body 12 with a predetermined pressing force, and the cylindrical part of the outer circumferential edge forming the fitting depressed groove 55 and the diameter-opening inclination 14b are sealed, for example, while being welded in such a way of circling by high-frequency welding, and the bottom of the fitting depressed groove 55 is abutted against the upper end of the thin-walled projecting cylinder portion 14a.

Herewith, when the cap 51 is welded into the case 11, the air E inside the thin-walled projecting cylinder portion 14a is mostly discharged out of the case 11, and thin-walled projecting cylinder portion 14a and the cap 51 are attached firmly. At the same time, the O-ring 61 is housed inside the diameter-expansion step portion 53, and the O-ring 61 prevents the silicon oil 21 from leaking between the axial portion 32A and the cap 51.

After the axial portion 32A projecting from the cap 51 is fitted into the mounting bore 72A of the driven gear 71, the upper side part of the square frustum 32b is heated, transformed, and expanded into the diameter-expansion step portion 72b. As a result, as shown in FIG. 20, the assembling of the rotary damper D is completed.

As described above, the fifth embodiment of the invention can achieve the same effect as the first embodiment and the third embodiment.

Since the distance a between the inner circumference of the arc-like through-bores 37 and the O-ring 61 is made closer than the distance b between the outer circumference of the arc-like through-bores 37 and the thin-walled projecting cylinder portion 14a, the silicon oil 21 gets through the O-ring 61, resistive portion 36D, and axial portion 32A due to the capillary phenomenon during the assembling. Accordingly, the O-ring 61 is prevented from sticking to the resistive portion 36D and the axial portion 32A, so that the silicon oil 21 stops overflowing out of the thin-walled projecting cylinder portion 14a.

Therefore, the silicon oil 21 gets through the O-ring 61, resistive portion 36D, and axial portion 32A, and the O-ring 61 can be prevented from sticking to the resistive portion 36D and the axial portion 32A. As a result, an increase of early torque of the rotary damper D can be prevented. Also, the silicon oil 21 stops overflowing out of the thin-walled projecting cylinder portion 14a so that the cap 51 can be reliably welded into the case 11, and the outer circumference of the housing can be sealed.

Also, when the cap 51 is welded into the case 11, the upper end of the thin-walled projecting cylinder portion 14a functions as a stopper so that a height from the bottom portion 13 to the cap 51 can be set evenly. As a result, the distance from the resistive portion 36D to the bottom portion 13 and cap 51 can be held constant, and variation of torque can be controlled.

In the first and fifth embodiments, an example with the circumferential groove 13a is shown; however, even if the circumferential groove 13a is not provided, the same function and effect can be achieved.

In case the circumferential groove 13a is not provided, the air retention portions (arc-like through-bores 37) and the air movement passages (depressed grooves 38) function in a similar fashion without being provided on a concentric circle.

Next, in the second embodiment, at least one of the circumferential groove 13a and the circumferential groove 54 may be provided as shown in the third and fifth embodiments.

Also, in the third and fifth embodiments, an example with the circumferential groove 13a and the circumferential groove 54 is shown; however, if at least one of the circumferential groove 13a and the circumferential groove 54 is provided, the same function and effect can be achieved.

Incidentally, the example that: the housing is constituted by the case 11 and cap 51; the housed portion 15 of the silicon oil 21 is provided in the case 11; the through-bore 52 wherein the axial portion 32 of the rotor 31 penetrates is provided in the cap 51; and the O-ring 61 prevents the silicon oil 21 from leaking between the cap 51 and the axial portion 32, is shown. However, the structure may be as follows. The housing portion of the silicon oil is provided in the cap, and the through-bore wherein the axial portion of the rotor penetrates is provided in the case, so that the O-ring prevents the silicon oil from leaking between the case and axial portion.

Moreover, the example that: the axial supporting portion 16 is provided in the case 11; and the cavity 33 is provided in the axial portions 32, 32A, so that the rotor 31 is supported to be rotatable, is shown. However, the cavity may be provided in the case, and the axial supporting portion may be provided in the axial portion.

Also, the example that the resistive portions 36, 36A-36D are integrally molded in the axial portions 32, 32A is shown. However, the axial portions and resistive portions may be separately molded, and, for example, rotate integrally in relation to a square shank and square hole.

The example with the silicon oil 21 for the viscous fluid is shown; however, other viscous fluid which functions in a similar fashion, for example, grease and so on may be used.

What is claimed is:

1. A rotary damper comprising:
    a housing;
    a viscous fluid housed inside the housing;
    a rotor disposed inside the housing and having an axial portion projecting from the housing, and a circular resistive portion which moves through said viscous fluid inside said housing, said rotor having a smooth outer periphery extending continuously without interruption and flat upper and lower surfaces without a projection; and
    a sealing member preventing said viscous fluid from leaking between said axial portion and said housing,
    wherein said resistive portion includes multiple air retention portions provided annularly and intermittently at the same radial distance from the axial portion thereof, and said housing has an air movement passage connecting two of the air retention portions, each of said air retention portions being formed by an elongated through-bore completely surrounded by a periphery.

2. A rotary damper according to claim 1, wherein said resistive portion has radially inner and outer portions relative to the air retention portions, said radially inner and outer portions being located in a same plane.

3. A rotary damper according to claim 2, wherein said resistive portion has a disc shape with the air retention portions therein extending circumferentially in an arc shape.

4. A rotary damper comprising:
    a housing;
    a viscous fluid housed inside the housing;
    a rotor disposed inside the housing and having an axial portion projecting from the housing, and a circular resistive portion which moves through said viscous fluid inside said housing, said resistive portion having a smooth outer periphery extending continuously without interruption and flat upper and lower surfaces without a projection; and
    a sealing member preventing said viscous fluid from leaking between said axial portion and said housing,
    wherein said resistive portion includes multiple air retention portions provided annularly and intermittently at the same radial distance from the axial portion, and said housing includes a circumferential annular groove facing the air retention portions and operating as an air movement passage connecting two of the air retention portions.

5. A rotary damper according to claim 4, wherein said resistive portion has one radially inner and one radially outer portion relative to the air retention portions, said radially inner and outer portions being located in a same plane.

6. A rotary damper according to claim 5, wherein said resistive portion has a disc shape with the air retention portions therein extending circumferentially in an arc shape.

7. A rotary damper according to claim 6, wherein said circumferential groove directly faces the air retention portions of the resistive portion in the disc shape without extending outwardly of the resistive portion.

8. A rotary damper according to claim 4, wherein said housing includes an additional annular groove at a side opposite to the annular groove facing the air retention portions.

9. A rotary damper according to claim 8, wherein said housing includes a flat portion having the circumferential annular groove in a middle thereof.

* * * * *